United States Patent [19]

Keskes

[11] Patent Number: 5,940,777
[45] Date of Patent: Aug. 17, 1999

[54] AUTOMATIC SEISMIC PATTERN RECOGNITION METHOD

[75] Inventor: Naamen Keskes, Pau, France

[73] Assignee: Elf Aquitaine Production, France

[21] Appl. No.: 08/836,754

[22] PCT Filed: Sep. 11, 1996

[86] PCT No.: PCT/FR96/01396

§ 371 Date: Aug. 4, 1997

§ 102(e) Date: Aug. 4, 1997

[87] PCT Pub. No.: WO97/11392

PCT Pub. Date: Mar. 27, 1997

[30] Foreign Application Priority Data

Sep. 19, 1995 [FR] France .................................. 95 10962

[51] Int. Cl.$^6$ .................................................. G06F 19/00
[52] U.S. Cl. ............................................. 702/16; 706/929
[58] Field of Search ................................. 702/16, 6, 7, 9, 702/11, 12, 13, 14, 17, 18; 706/928, 929

[56] References Cited

U.S. PATENT DOCUMENTS

| | | | |
|---|---|---|---|
| 5,181,171 | 1/1993 | McCormack | 364/421 |
| 5,355,313 | 10/1994 | Moll et al. | 364/420 |
| 5,373,486 | 12/1994 | Dowla et al. | 367/135 |

OTHER PUBLICATIONS

J. Parikh, et al., "Selective detection of linear features in geological remote sensing data", *Proceedings of SPIE: Applications of Artificial Neural Networks III*, vol. 1709, No. 2, Apr. 21–24, 1992, Orlando, Florida, pp. 963–972.

W. Maurer, et al., "Seismic event interpretation using self-organizing neural networks", *Proc. SPIE: Applications of Artificial Neural Networks III*, vol. 1709, No. 2, Apr. 21–24, 1992, Orlando, Florida, pp. 950–958.

K. Y. Huang, et al., "A hybrid neural network for seismic pattern recognition", *IJCNn International Joint Conference on Neural Networks*, vol. 3, Jun. 7–11, 1992, Baltimore, Maryland, pp. 736–741.

*Primary Examiner*—Donald E. McElheny, Jr.
*Attorney, Agent, or Firm*—Ostrolenk, Faber, Gerb & Soffen, LLP

[57] ABSTRACT

An automatic seismic pattern recognition method includes the steps of: determining a given number of seismic patterns to be recognized; providing a set of seismic trace portions for the region; defining a pattern recognition parameter common to all the trace portions, and determining the value of the parameters for each of the traces portions of the set. The method also includes the steps of: selecting trace portions of the set; selecting a one-dimensional neural network containing as many cells as there are patterns to be recognized where each cell is assigned a value of the recognition parameter; and submitting the neural network to a learning process with the selected trace portions so that at the end of the process each cell matches a pattern to be recognized and so that the patterns are progressively ordered. The method also includes the steps of: presenting each trace portion of the set to be processed to the classified and ordered neural network and attributing to each trace portion presented to the network the number of the cell closest to it.

17 Claims, 3 Drawing Sheets

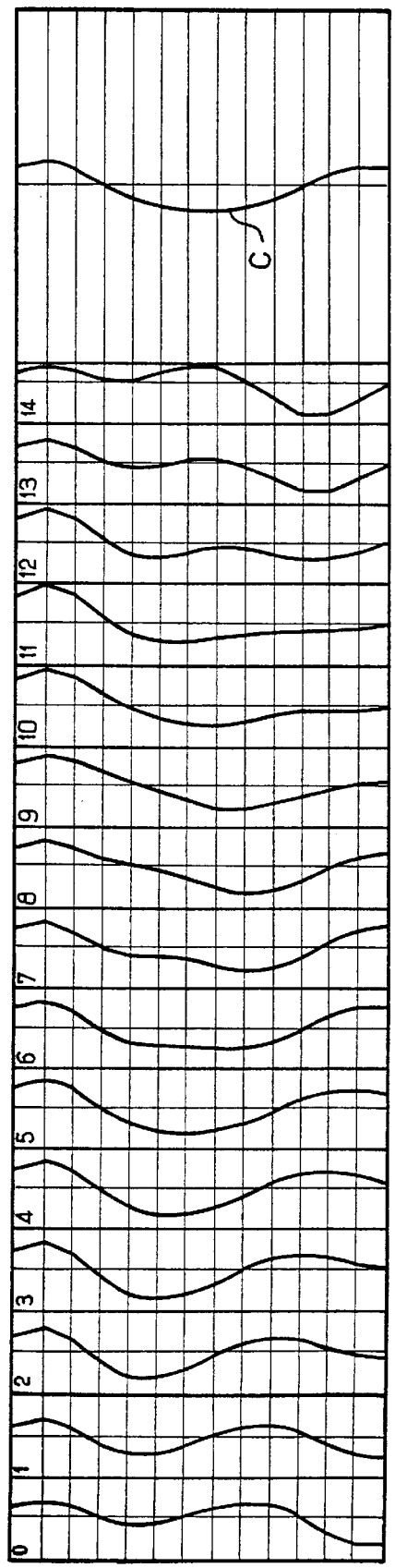
FIG_2

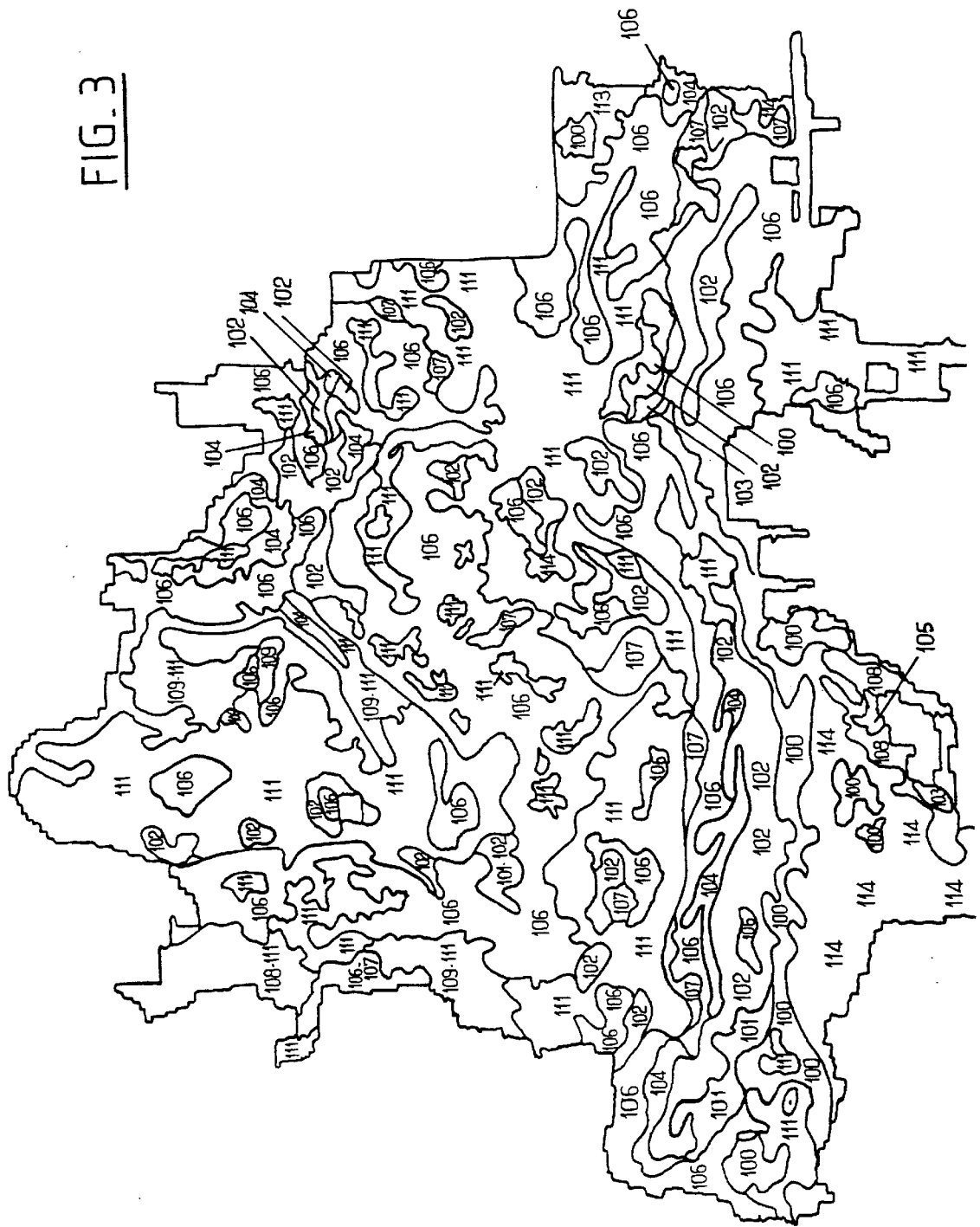

AUTOMATIC SEISMIC PATTERN RECOGNITION METHOD

BACKGROUND OF THE INVENTION

The present invention relates to a method for automatic recognition of seismic facies between two horizons, or about a horizon of a geological area, or, more particularly between two horizons or about a horizon defined on a seismic section associated with said geological area.

At present, nearly all geological and geophysical interpretations relative to seismic facies are carried out on an interpretation station and belong to the specialized domain of seismic stratigraphy.

In seismic stratigraphy, it is customary to identify and to represent on a map the variations of seismic facies in a given slice of the geological area to be surveyed (called mapping). The slice may or may not be between two marked horizons.

A seismic facies unit is a group of seismic reflections having configurations, i.e., external shape and internal parameters, which are different from one facies unit to another. The configurations may also be different between two adjacent or consecutive facies units.

The seismic facies units are usually defined by analyzing three families of parameters:

- the configuration of the reflections, (e.g., parallel, divergent, sigmoid, etc.),
- the external shape (e.g., concave upwards, convex upwards, draped, etc.),
- the internal parameters of the reflections (e.g., amplitude, frequency, etc.).

The recognition of the seismic facies in a given geological area is very important because it provides useful information, particularly about the types of sedimentary deposits and the anticipated lithology.

To succeed in recognizing the seismic facies of a given geological area, it is necessary to define each of them first by separately analyzing at least each of the above-mentioned three families of parameters. Next, the parameters should be synthesized in order to gather the maximum data or information about the seismic facies present in the geological area.

The cost of such an analysis and the means to be employed, particularly the data processing means, are excessively high as compared to the results obtained.

In fact, if the seismic facies which one wishes to recognize belong to stratigraphic pinchouts and/or to turbiditic channels, it is very difficult to discriminate between the anomalies when they appear on the usual seismic sections, even if those anomalies are recognized by the well seismic survey as being present in the area concerned, provided that a well is available in the area, which may not be the case.

In EP-0 561 492, a method is described for improving the well logging by making use of neural networks. The particular network described is a layered network. From a statistical standpoint, a layered network is a universal approximator of the boundaries between classes, but, above all it is, a supervised network. In other words, the quantity obtained in the output of the neural network is compared with a quantity known and determined by other methods, until a coincidence or quasi-coincidence is obtained between the quantities.

Since the topological maps due to Kohonen are used in other fields, particularly in the medical field to determine models susceptible to imitate a number of the functions of the brain by reproducing some of its basic structures, geophysicists have attempted to apply them to the field of geophysics.

Particular applications are described in U.S. Pat. No. 5,373,486, which deals with the classification of seismic events by using Kohonen antagonistic networks, in U.S. Pat. No. 5,355,313, which describes the interpretation of aeromagnetic data, and in U.S. Pat. No. 5,181,171, which describes an interactive neural network adapted to detect the first arrivals on the seismic traces.

SUMMARY OF THE INVENTION

It is an object of the present invention to propose a method for recognizing seismic facies from a seismic section associated with a geological area, and to do this automatically via an unsupervised neural network.

The present invention relates to a method for recognizing seismic facies between two horizons or about a horizon of a geological area, and comprises the steps of:

- determining a given number of seismic facies to be recognized,
- taking a set of seismic trace portions concerning said area,
- defining a facies recognition parameter common to all the trace portions and determining the value of said parameter for each of the trace portions of the set,
- selecting trace portions from said set,
- choosing a one-dimensional neural network containing as many cells as facies to be recognized, each cell being assigned a value of the recognition parameter,
- effecting the learning of the neural network via the selected trace portions, so that, when the learning process is complete, each cell corresponds to a facies to be recognized, and so that said facies are gradually ordered,
- presenting each trace portion of said set to be processed to the classed and ordered neural network, and
- assigning the number of the nearest cell to each of the trace portions presented to the network.

One advantage of the present invention is that it allows the identification for example, of a variation of seismic facies corresponding to a stratigraphic pinchout or to lineaments which can be interpreted as faults.

According to another feature, the neural network is of the unsupervised type and consists in particular of a one-dimensional Kohonen topological map.

According to a further feature, the trace portions comprise the same number of samples and the recognition parameter is defined by the sequence of samples comprised between the two horizons or about the horizon delimited on a seismic section.

According to a further feature, the trace portions are used to determine an overall recognition parameter common to all the trace portions.

According to a further feature, each facies is assigned a color code, the different colors being gradually ordered in a given range of colors with a slow variation of shade between any two consecutive colors of the range.

According to a further feature, the seismic facies recognized are represented on a map with their corresponding color.

A further advantage of the present invention resides in the fact that, in accordance with the general knowledge about the geological area to be surveyed and obtained by other means, it is possible to use attributes associated with the seismic traces which are derived either from the sequence of samples between the top and the base of the trace element, i.e., between two horizons or about a horizon of said area, or from the overall statistical parameters which are significant to the distribution of the samples in the geological area concerned. The overall parameters may be, for example, the amplitude, frequency, interval velocity etc.

The above and other advantages and features of the present invention will appear from a reading of the description of the method of the invention, and from the appended drawings wherein;

DETAILED DESCRIPTION OF THE INVENTION

Figure 1:
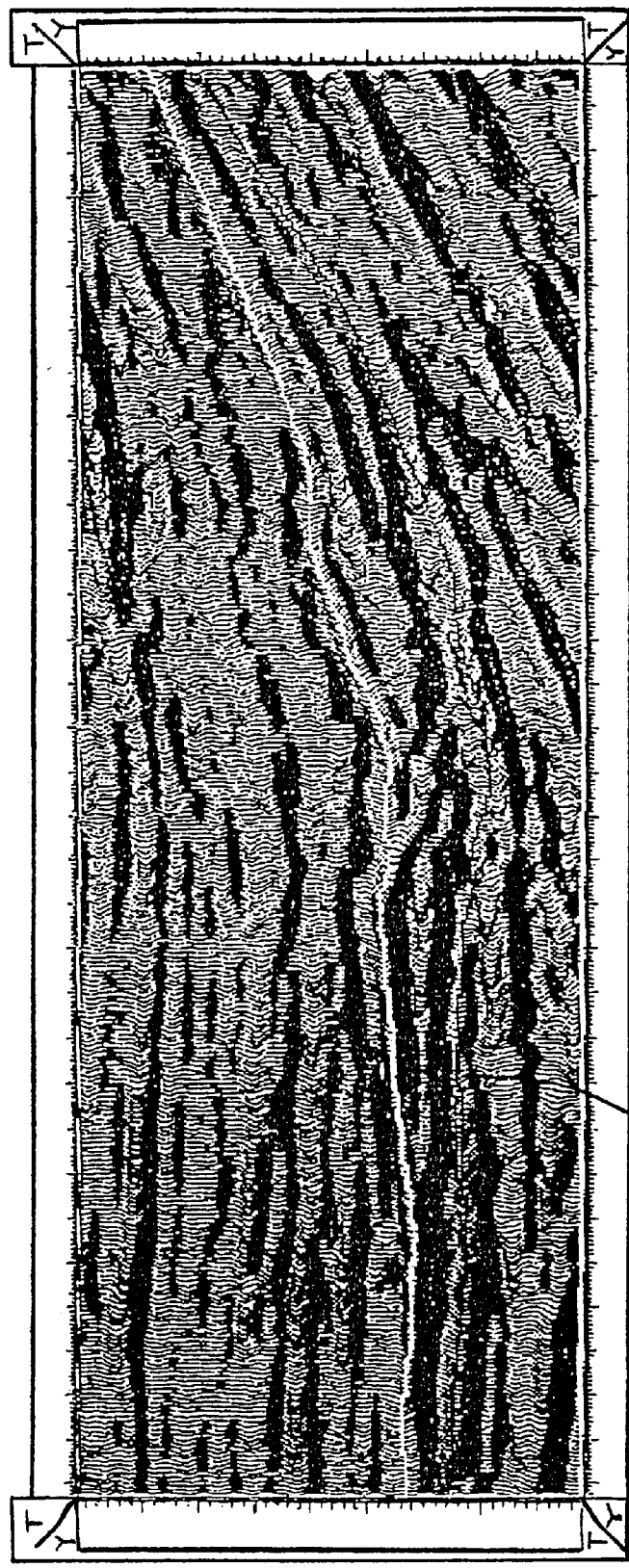
FIG. 1 is a seismic section on which a turbiditic channel is delimited about a marked horizon, FIG. 2 schematically represents a final topological map obtained according to the invention, and FIG. 3 schematically represents a map of the seismic facies associated with the geological area corresponding to the set of seismic trace portions processed.

The method of the present invention uses an unsupervised one-dimensional neural network which comprises as many cells as seismic facies to be recognized in a given geological area. The seismic facies may be located between two horizons or about a horizon, and are determined by picking a seismic section which contains a large number of seismic traces, in the range of at least several hundred traces (for example, about horizon H in FIG. 1). A set of seismic trace portions is delimited, on the traces which are bounded by the horizons or about the horizon. These seismic trace portions are used to prepare a topological map in the manner described below.

According to the method of the invention, a seismic facies recognition parameter is defined where the parameter is common to all the trace portions. With reference to the example shown in FIG. 2, the parameter is defined by the shape of the signal. There are fifteen signal shapes numbered from 0 to 14, each one corresponding to a seismic facies. Obviously, two signal shapes may be similar to one another which means that any corresponding seismic facies are similar in nature and/or are continuous. The value of the recognition parameter is determined, which, in the example of the signal shape, is made up of the sequence of samples on the trace portion concerned. Each trace portion is sampled in the same way (i.e., comprises the same number of samples) while the amplitude of the samples may vary from one sample to another in the same sequence, or in different sequences.

A number of trace portions are selected from the set of trace portions to be processed, for example, by selecting one trace portion out of four, or by making a random or pseudo-random selection.

In a further step of the invention, the learning of the neural network is effected via selected trace portions so that, when the learning process is complete, each set corresponds to a facies to be recognized. This is shown in FIG. 2, where the fifteen cells numbered from 0 to 14 correspond to the given number (fifteen) of facies to be recognized and each facies is being determined by the shape of the signal shown in one of the fifteen classes corresponding to the fifteen facies to be recognized. To achieve the dual objective of classifying and ordering the classes, the following learning process is obtained.

Let E be the set of selected trace portions to be classified, and M be the set of cells of the topological map.

In a first learning phase, the weights of the cells of the topological map are initialized in a random fashion.

In a second learning phase, a search is made of the topological map to find, for each trace portion $E_i$ of the set E, the cell $M_i$ nearest to $E_i$. The weights of the $M_j$ cells belonging to the neighborhood of the $M_i$ cell are then updated.

This phase is represented by the following equation:

$$M_j(t)=M_j(t-1)+f[\epsilon(t), d, \sigma(t)]*[E_i(t)-M_j(t-1)]$$

where:

$$[\epsilon(t), d, \sigma(t)]=\epsilon(t)*\exp[(=d^2/\sigma^2(t)];$$

d is the distance between cell $M_i$ and cell $M_j$;

s(t) is the neighbor parameter;

e(t) is a gain factor.

According to another feature of the invention, e(t) is smaller than 1 and preferably equal to about 0.7 on the first iteration where e(t) and s(t) decrease after each cycle of presentation of the trace portions or iteration. The iterations are considered to be completed when the desired convergence is achieved, i.e., when a new presentation of the selected trace portions does not modify or only slightly modifies the ordering of the cells.

When the learning process is complete, all the trace portions to be processed are presented on the topological map in order to classify them and to order them with respect to the classes defined in the topological map.

Each trace portion presented on the topological map is assigned the number of the cell which corresponds to it, i.e., the cell having signal shape which is the nearest to the shape of the signal of said trace portion presented.

In a preferred embodiment of the invention, prior to the presentation of all the trace portions each class or cell of the topological map is assigned a given color instead of a number. The fifteen cells numbered from 0 to 14 on the topological map in FIG. 2 can correspond to fifteen different colors, which range gradually, for example, from brown (class 0) to purple (class 14). The different tones of any given color would signifying that the corresponding classes are close to one another. FIG. 2 also shows, on the right side thereof, a trace portion C to be classified. If it is presented on the topological map, it is classified in cell 7 or, if necessary, in cell 6. It is noted that cell 6 corresponds to a facies that is substantially similar to the facies defined by cell 7.

FIG. 3 schematically represents a map of seismic facies of the geographical area or layer surveyed where each seismic facies corresponds to one of the classes, 0 to 14, of the final topological map. Numerals 100 to 114 correspond respectively to classes 0 to 14 of the topological map in FIG. 2. It may be observed that different classes are imbricated and/or are included in other classes.

I claim:

1. A method for the automatic recognition of seismic facies which are at least one of between two horizons and about a horizon of a given geological area, comprising the steps of:

determining a given number of seismic facies to be recognized, taking a set of seismic trace portions concerning said area, defining a facies recognition parameter common to all said trace portions and determining a value of said parameter for each of said trace portions of said set, selecting trace portions from said set, choosing a one-dimensional neural network containing as many cells as facies to be recognized, each cell being assigned the value of the recognition parameter, making the neural network learn from the selected trace portions so that, when the step of learning is complete, each cell corresponds to at least one of said facies to be recognized and said facies are gradually ordered, presenting each trace portion of said set to be processed to the classified and ordered neural network, and assigning a number of the nearest cell to each of the trace portions presented to the network.

2. The method of claim 1, wherein said neural network is an unsupervised network.

3. The method of claim 2, wherein said unsupervised neural network is a one-dimensional Kohonen topological map.

4. The method of claim 1, wherein said trace portions comprise the same number of samples and said recognition parameter is defined by said sequence of samples comprised between the two horizons or about said horizon.

5. The method of claim 1, wherein an overall recognition parameter is determined which is common to all said trace portions.

6. The method of claim 1, wherein each cell corresponds to a class which is assigned a color code, the different colors being gradually ordered in a given range of colors with a slight variation in shade between any two consecutive colors of said range.

7. The method of claim 1, wherein said recognized seismic facies are represented on a map with their corresponding number.

8. The method of claim 6, wherein said recognized seismic facies are represented on a map with their corresponding color.

9. A method for automatically classifying seismic facies of a given geological area comprising the steps of:

determining a number of seismic facies to be classified;

obtaining a set of seismic trace portions from said geological area;

defining a seismic facies recognition parameter which is common to all said seismic trace portions;

determining values of said seismic facies recognition parameter for each of said seismic trace portions of said set;

selecting a subset of trace portions from said set of seismic trace portions;

obtaining a one-dimensional neural network having a number of cells equal to said number of seismic facies to be classified, each cell being assigned a cell value corresponding to one of said values of said seismic facies recognition parameter;

automatically ordering said neural network cells such that differences between adjacent cell values in said neural network are substantially minimized to obtain ordered cells;

assigning a classification indicia to each cell of said ordered cells;

comparing said values of said seismic facies recognition parameter of said seismic trace portions of said set with said cell values of said neural network; and assigning each of said seismic trace portions said classification indicia of said cell corresponding therewith.

10. The method of claim 9, wherein said geological area comprises at least several hundred seismic traces.

11. The method of claim 9, wherein said geological area is bounded by two horizons.

12. The method of claim 9, wherein said geological area is bounded by an area about an horizon of said area.

13. The method of claim 9, wherein the step of automatically ordering said neural network comprises the steps of:

assigning weights to said cells of said neural network in a random fashion;

for each seismic trace portion, locating a cell of said neural network most nearly corresponding thereto; and changing the weights of said cells near said cell corresponding to said seismic trace portion.

14. The method of claim 13, wherein said steps correspond to the following equation:

$$M_j(t)=M_j(t-1)+f[\epsilon(t), d, \sigma(t)]*[E_i(t)-M_j(t-1)]$$

where:

$$[\epsilon(t), d, \sigma(t)]=\epsilon(t)*\exp[(=d^2/\sigma^2(t)];$$

d is the distance between cell $M_i$ and cell $M_j$;

s(t) is the neighbor parameter; and $\epsilon(t)$ is a gain factor.

15. The method of claim 14, wherein $\epsilon(t)$ is less than 1.

16. The method of claim 14, wherein $\epsilon(t)$ is about 0.7.

17. The method of claim 14, wherein the magnitudes of $\epsilon(t)$ and s(t) decrease for each iteration of locating said cell corresponding to said seismic trace portions.

* * * * *